(12) United States Patent
Neto

(10) Patent No.: US 7,766,035 B2
(45) Date of Patent: *Aug. 3, 2010

(54) FLUID JET FOR PROVIDING FLUID UNDER PRESSURE TO A DESIRED LOCATION

(75) Inventor: Jose Correa Neto, Rochester, MI (US)

(73) Assignee: Metaldyne, LLC, Plymouth, MI (US)

( * ) Notice: Subject to any disclaimer, the term of this patent is extended or adjusted under 35 U.S.C. 154(b) by 414 days.

This patent is subject to a terminal disclaimer.

(21) Appl. No.: 11/634,489

(22) Filed: Dec. 6, 2006

(65) Prior Publication Data
US 2008/0295900 A1 Dec. 4, 2008

(51) Int. Cl.
F16K 15/04 (2006.01)
F01P 3/08 (2006.01)

(52) U.S. Cl. .......... 137/539; 137/533.19; 137/543.19; 123/41.35

(58) Field of Classification Search ............ 137/533.19, 137/539, 543.19, 469; 123/41.35, 196 R
See application file for complete search history.

(56) References Cited

U.S. PATENT DOCUMENTS

| | | | | |
|---|---|---|---|---|
| 1,572,464 | A * | 2/1926 | Bjorklund | 137/539 |
| 1,574,537 | A * | 2/1926 | Burch | 137/539 |
| 1,942,313 | A * | 1/1934 | Viele et al. | 137/539 |
| 1,999,693 | A * | 4/1935 | Hill | 137/539 |
| 2,566,775 | A * | 9/1951 | Otis | 137/469 |
| 2,704,549 | A * | 3/1955 | Strnad | 137/469 |
| 2,800,119 | A | 7/1957 | Schmidl | |
| 3,365,648 | A | 1/1968 | Benjamin | |
| 3,375,844 | A * | 4/1968 | Mercier et al. | 137/469 |
| 3,480,113 | A | 11/1969 | Pope et al. | |
| 3,485,324 | A | 12/1969 | Novak | |
| 3,709,109 | A * | 1/1973 | Howe | 123/41.35 |
| 3,894,556 | A | 7/1975 | Pareja | |
| 4,566,486 | A * | 1/1986 | Taylor et al. | 137/469 |
| 4,869,211 | A | 9/1989 | Heberle et al. | |
| 4,901,679 | A * | 2/1990 | Hodgkins et al. | 123/41.35 |
| 4,995,346 | A | 2/1991 | Hudson | |

(Continued)

FOREIGN PATENT DOCUMENTS

JP 03-168317 11/2001

(Continued)

OTHER PUBLICATIONS

Written Opinion of the International Searching Authority, PCT/US04/27645, Aug. 25, 2004, Metaldyne Company LLC.

Primary Examiner—John Rivell
(74) Attorney, Agent, or Firm—McDonald Hopkins LLC

(57) ABSTRACT

A fluid jet for providing fluid under pressure to a desired location is disclosed wherein the valve body includes and integral valve element retaining region. Preferably, the valve body and integral valve element retaining region are die cast as a one-piece component. More specifically, the fluid jet includes a die cast one-piece valve body having a valve element retaining region extending longitudinally within at least a portion of the valve body, at least one fluid passage extending longitudinally within at least a portion of the valve body and in fluid communication with at least a portion of the valve element retaining region, and at least one fluid-exiting aperture through the valve body in fluid communication with the at least one fluid passage.

20 Claims, 3 Drawing Sheets

U.S. PATENT DOCUMENTS

| | | | |
|---|---|---|---|
| 5,533,472 A | 7/1996 | Sands et al. | |
| 5,881,684 A | 3/1999 | Bontaz | |
| 5,967,180 A | 10/1999 | Yates | |
| 6,672,262 B2 | 1/2004 | Bontaz | |
| 6,840,270 B2 | 1/2005 | Yu et al. | |
| 7,152,623 B2 * | 12/2006 | Neto | 137/539 |

FOREIGN PATENT DOCUMENTS

| | | |
|---|---|---|
| JP | 03-184549 | 3/2003 |

* cited by examiner

FLUID JET FOR PROVIDING FLUID UNDER PRESSURE TO A DESIRED LOCATION

CROSS REFERENCE TO RELATED APPLICATIONS

This application claims priority from U.S. patent application Ser. No. 10/914,297, entitled "Fluid Jet for Providing Fluid Under Pressure to a Desired Location", filed on Aug. 9, 2004 which claims priority to U.S. Provisional Patent Application Ser. No. 60/501,472, filed on Sep. 9, 2003.

FIELD OF THE INVENTION

The present invention relates generally to fluid jets for providing fluid under pressure to a desired location, and more particularly, to a fluid jet having a valve element retaining region integrally formed with the valve body.

BACKGROUND

The pistons of gasoline engines, diesel engines, and high performance engines become easily overheated during operation. Pressure actuated oil jets have long been used to cool the under side of the pistons in such reciprocating engines. Such oil jets are often mounted in a bore on the underside of the engine block and receive oil under pressure from an oil gallery. These oil jets also incorporate a check valve to supply oil to the oil jet when a predetermined oil pressure is achieved and also prevent siphoning off of needed oil pressure during low oil pressure conditions.

Oil jets spray oil into cooling channels on the underside of the pistons, cooling the piston crowns and surrounding cylinder wall by absorbing heat (thus lowering combustion chamber temperatures). This occurs while the engine is running. This practice reduces piston temperatures, which helps the engine develop more power and assists in lubricating the piston and cylinder wall to increase durability. The extra oil layer on the cylinder bores and reciprocating components also minimizes noise that typically emanates from these components. The optimum operating temperatures also enhance the life of the critical engine parts and reduce maintenance costs.

There are two standard types of pressure actuated oil jets used in the industry, each comprising a two-part configuration. As shown in FIG. 1, typical pressure actuated oil jets comprise a two-piece construction comprising an oil jet body 10 and an oil jet valve 12. The oil jet body 10 comprises a main body 14 having a valve aperture 16 at one end and a bolt-receiving aperture 18 at the other end. Extending from the sides of the main body 14 are two nozzles 20 which are in fluid communication with the interior of the valve aperture 16.

The valve 12 generally comprises a tubular sleeve 22 having a threaded exterior portion 24 and a pair of oil exiting apertures 26. The sleeve 22 is further connected to an oversized head 28 at one end. Therefore, in assembly of the typical two-piece oil jet assembly, the valve 12 is inserted within the valve aperture 16 until the oil exiting apertures 26 of the valve 12 line up with the nozzles 20. The threaded portion 24 of the valve 12 threadedly engages a threaded bore in the lower portion of the engine block which transfers oil under pressure from the oil gallery to the valve 12.

There are generally two valve constructions used in the industry to handle pressure actuation: a ball valve construction (shown in FIG. 1A) and a piston valve construction (shown in FIG. 1B). While both constructions are further described below, it should be understood that for simplicity, like elements are identified by like numbers.

As best shown in FIG. 2, the ball valve 30 comprises a tubular sleeve 32 connected at one end to an oversized head 40. The sleeve further includes a pair of oil exiting apertures 36 which communicate with the nozzles of the oil jet body when the ball valve is placed within the valve body 10. A bore 38 extends through the head 40 and sleeve 32 as a passage for oil entering the ball valve 30. At the end opposite the head 40, the bore 38 tapers to create a seat 42 which communicates with an oil entrance opening 44.

A spring 46 is held within the bore 38 and urges a ball 48 against the seat 42 to create a valve-closed position. A cap 50 is placed over the bore 38 at the head 40 to retain the spring 46 within the sleeve 32. When the oil pressure is above a predetermined value, oil under pressure passes through the oil entrance opening 44 to overcome the spring force and depress the ball 48 against the spring 46 thereby creating a valve open position. The oil under pressure enters the bore 38 and exits the oil exiting openings 36 as indicated by the arrows X and Y of FIG. 2. The oil exiting apertures 36 are in fluid communication with the nozzles in the separate body 10 which direct oil to the pistons. When the oil pressure falls below a predetermined value, the spring 46 urges the ball 48 against the seat 42 to prevent a siphoning off of oil pressure and create a valve-closed position.

A particular disadvantage with the ball valve construction is that the ball 48 is unstable and is capable of lateral movement within the bore 38 as shown by arrows A and B. The unstable ball 48 begins to vacillate in response to the high-pressure oil flowing therearound. Such vacillation agitates the oil causing aeration which decreases the cooling and lubricating effect of the oil.

As shown in FIG. 3, the second oil jet configuration comprises a piston valve construction. The piston valve 52 comprises a tubular sleeve 32 connected at one end to an oversized head 40. The sleeve further includes a pair of oil exiting apertures 36 at its lower end which communicate with the nozzles of the separate oil jet body 10. A bore 38 extends through the head 40 and sleeve 32 as a passage for oil entering the piston valve 52. At the end opposite the head 40 and below the oil exiting apertures 36, the bore 38 tapers to create a seat 42 which communicates with an oil entrance opening 44.

A spring 46 is held within the bore 38 and urges a piston 54 against the seat 42 to create a valve-closed position. A cap 50 is placed over the bore 38 at the head 40 to retain the spring 46 within the sleeve 32. When the oil pressure is above a predetermined value, oil under pressure passes through the oil entrance opening 44 to overcome the spring force and depress the piston 54 and reveal the oil exiting apertures 36 thereby creating a valve open position. The oil under pressure enters the bore 38 and exits the oil exiting openings 36 as indicated by the arrows Y and X of FIG. 3. The oil exiting openings 36 are in fluid communication with the nozzles in the separate body 10 which direct oil to the pistons. When the oil pressure falls below a predetermined value, the spring 46 urges the piston 54 against the seat 42 to prevent a siphoning off of oil pressure and create a valve-closed position.

The piston valve design generally reduces the agitation and aeration because the piston head 54 is guided by the cylinder wall with no unstable object in the oil flow path. While the piston valve design has advantages over the ball valve design, both designs are generally made from an excessive number of parts which are expensive to manufacture and difficult to assemble.

Therefore, there is a need in the art to create a fluid jet that is easier to manufacture and has fewer component parts.

There is also a need in the art to create a fluid jet that is more cost effective to manufacture and less labor intensive to produce.

There is also a need in the art to provide a fluid jet that reduces the turbulence and aeration of the fluid during flow through the oil jet.

SUMMARY OF THE INVENTION

Therefore, it is an object of the present invention to provide a fluid jet that prevents vacillation of the closure component so as to reduce fluid flow turbulence and aeration.

The fluid jet of the present invention includes the functional advantages of the known piston valve oil jet while being easier and more cost effective to manufacture. Further, by providing an integral a valve element retaining region which prevents the vacillation of the valve element, numerous advantages are realized over the prior art and numerous oil jet configurations can be achieved to reduce costs, such as using any number of valve element retaining region shapes, flanges or edges to retain the valve element. Further, by casting the body of the fluid jet as a one-piece component, additional component and labor costs are dramatically reduced.

These and other objects and advantages are achieved by providing a fluid jet for providing fluid under pressure to a desired location wherein the valve body includes an integral valve element retaining region. Preferably, the valve body and integral valve element retaining region are die cast as a one-piece component. More specifically, the fluid jet of the present invention includes a die cast one-piece valve body having a valve element retaining region extending longitudinally within at least a portion of the valve body, at least one fluid passage extending longitudinally within at least a portion of the valve body and in fluid communication with at least a portion of the valve element retaining region, and at least one fluid-exiting aperture through the valve body in fluid communication with the at least one fluid passage.

DESCRIPTION OF THE DRAWINGS

Objects and advantages together with the operation of the invention may be better understood by reference to the following detailed description taken in connection with the following illustrations, wherein.

DETAILED DESCRIPTION OF THE INVENTION

Figure 1:
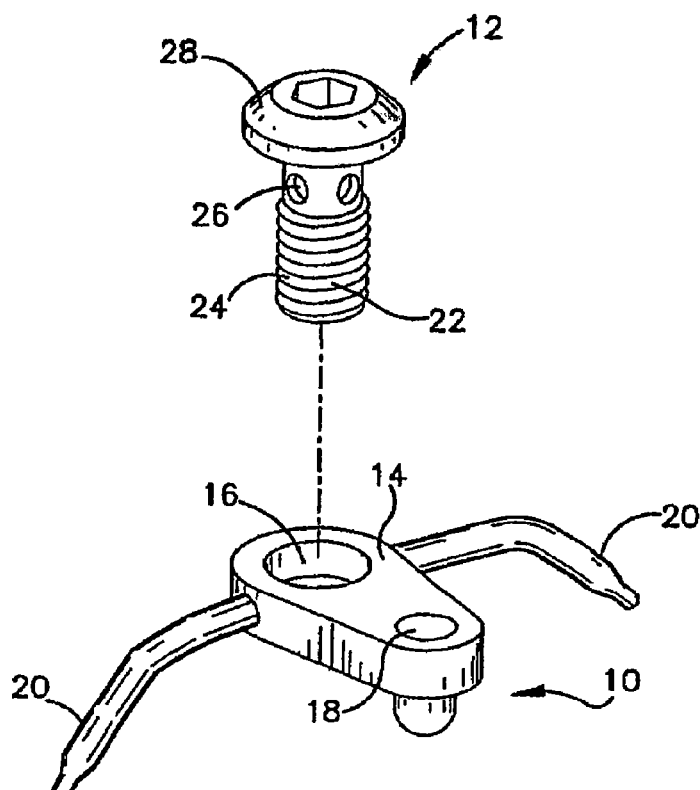
FIG. 1 is an exploded view of a known oil jet valve and oil jet body prior to assembly.
Figure 1A:
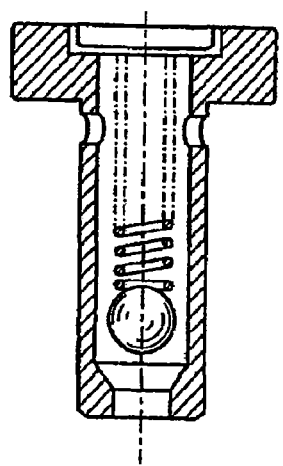
FIG. 1A is a cross-sectional view of a known oil jet valve of a ball-type check valve.
Figure 1B:
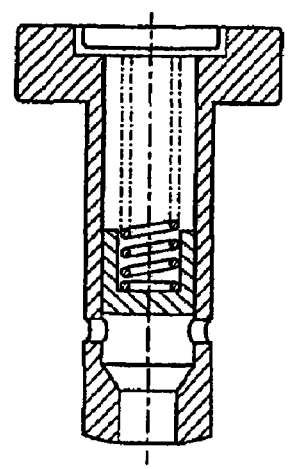
FIG. 1B is a cross-sectional view of a known oil jet valve of the piston valve type.
Figure 2:
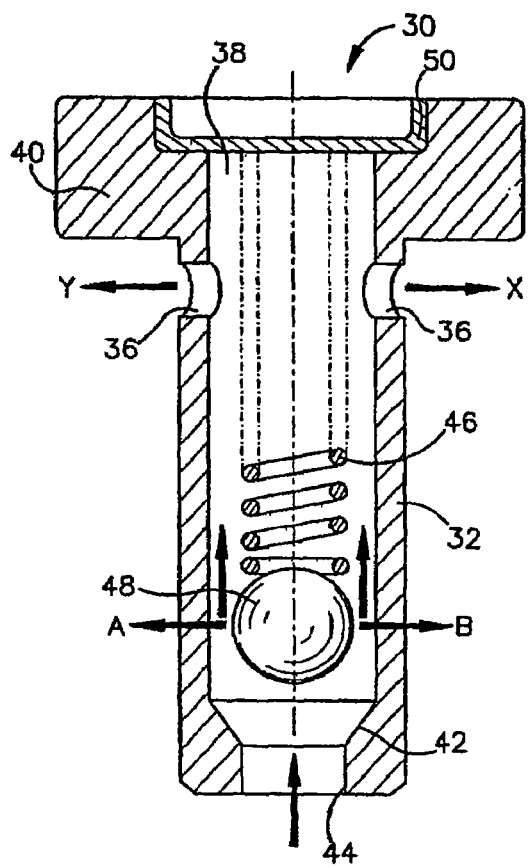
FIG. 2 is an enlarged view of FIG. 1A.
Figure 3:
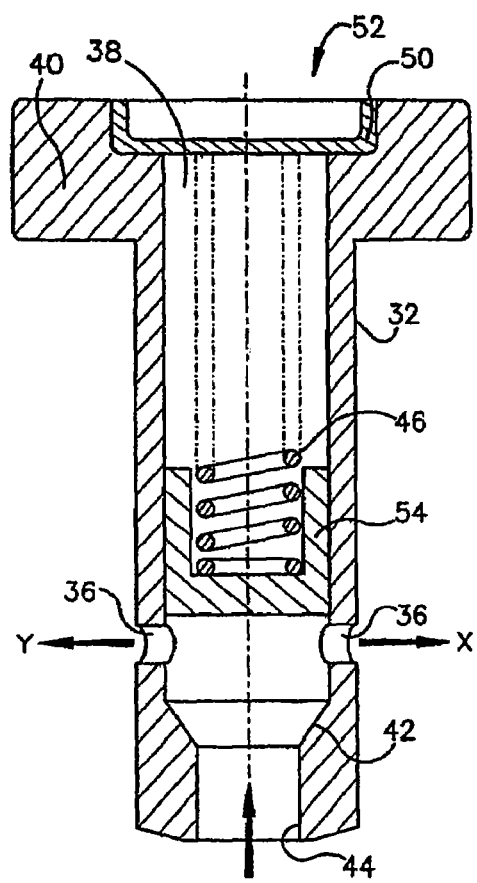
FIG. 3 is an enlarged view of FIG. 1B.

The present invention is directed to a fluid jet for providing fluid under pressure to a desired location. However, the following detailed description is directed to the preferred embodiment of the invention, an oil jet for use with an internal combustion engine for providing oil under pressure to a desired location. It should be understood that nothing in the following description of the preferred embodiment should limit the scope of the invention to the preferred embodiment.

The preferred embodiment of the present invention will now be described with reference to FIGS. 4-6. As best shown in FIG. 5, an oil jet, generally designated as 98, according to the preferred embodiment of the present invention utilizes a valve body 100 having an integral valve element retaining region 112. Enclosed within the valve element retaining region 112 is a spring biased valve element 115 retained therein by a cap 120 connected to the valve body 100. A nozzle 122 is connected to the valve body 100 so as to direct oil under pressure to a desired location.

Figure 4:
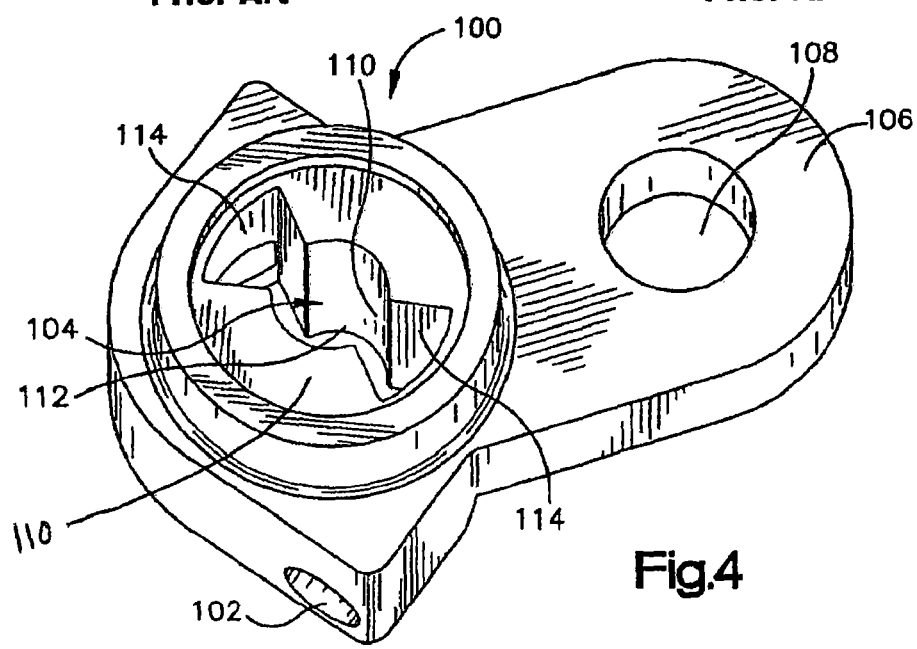
FIG. 4 is perspective view of the oil jet valve body of the present invention.
Figure 5:
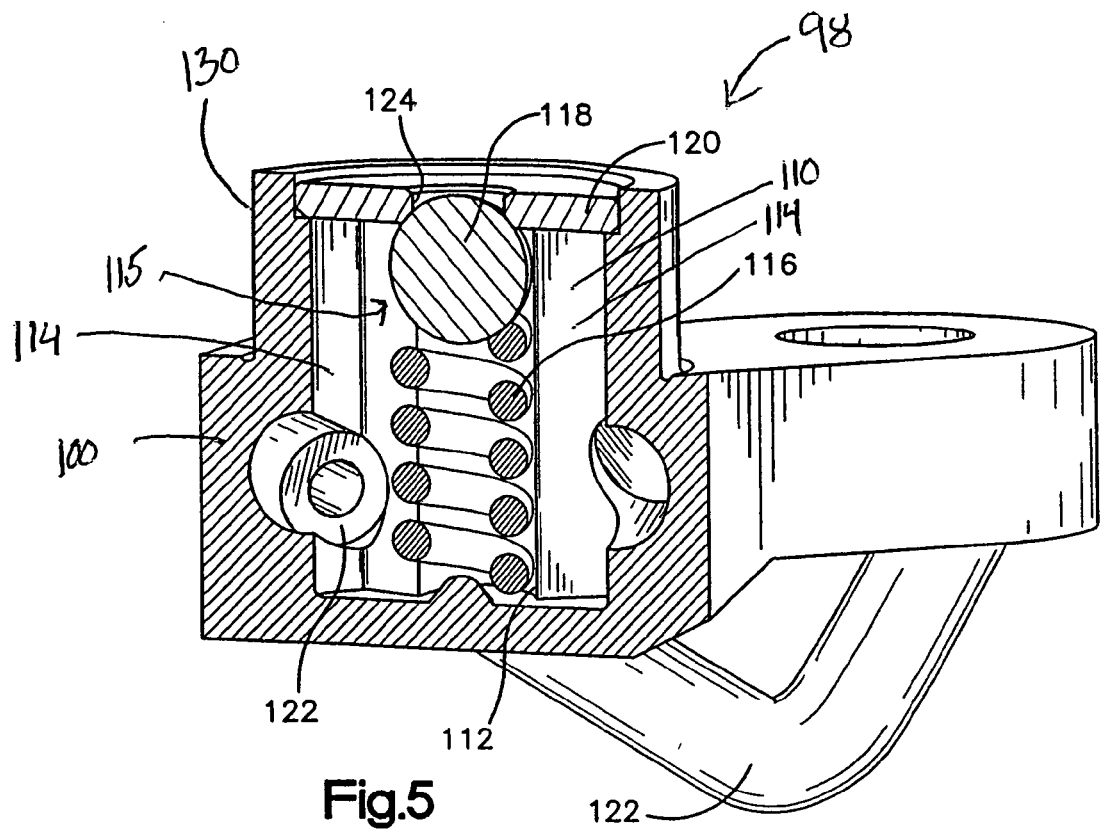
FIG. 5 is a cross-sectional view of the oil jet of the present invention.

As best shown in FIG. 4, the valve body 100 is preferably a die cast, one-piece component and most preferably manufactured from powdered metal due to its relatively low cost and ease of use. The valve body 100 has an integrally formed valve element retaining region 112, at least one fluid passage 114 in fluid communication with the valve element retaining region 112, and at least one fluid-exiting aperture 102 extending through the valve body 100 in fluid communication with the at least one fluid passage 114. As shown in the drawings, the valve body 100 preferably utilizes a pair of fluid passages 114 in fluid communication with the valve element retaining region 112 and a pair of fluid-exiting apertures 102 in fluid communication with the associated fluid passages 114.

With continued reference to FIG. 4, the valve element retaining region 112 extends longitudinally within at least a portion of the valve body 100 for preventing the valve element 115 from vacillating within the valve body 100 and causing fluid aeration and cavitation during a valve-open position. In the preferred embodiment, the valve element retaining region 112 is defined by a pair of confronting walls 110 extending longitudinally within at least a portion of the valve body 100 and integral therewith. The walls 110 extend inwardly within the cavity 104 to define the valve element retaining region 112. Preferably, at least a portion of the surface of the walls 110 are semi-circular in shape so as to retain the valve element ball generally between the retaining region orifice and its base. However, other wall configurations could be utilized to prevent the valve element 115 from vacillating within the valve body 100.

The fluid passages 114 extend longitudinally within at least a portion of the valve body 100 and are in fluid communication with at least a portion of the valve element retaining region 112. In the preferred embodiment, the oil passages 114 are at least partially defined by the walls 110. More specifically, the oil passages 114 are located opposite each other about the valve retaining region 112 and are each in fluid communication with the valve retaining region 112 longitudinally therealong. However, it should be clear that numerous other positions and configurations for the oil passages could be utilized while still being within the scope of the present invention.

Fluid-exiting apertures 102 extend through the valve body 100 in fluid communication with the oil passages 114. Nozzles 122, described in greater detail below, will be connected to the oil-exiting apertures 102 to divert oil under pressure to the desired location. The valve body 100 may also have a mounting tab 106 having an aperture 108 through which a mounting bolt (not shown) could connect the oil jet 98 to the underside of an engine block.

With reference to FIG. 5, a fluid pressure actuated valve element 115 is placed within the valve element retaining region 112 and is moveable longitudinally therealong between a valve-open position and a valve-closed position (FIG. 5 shows a valve closed position). The preferred embodiment of the present invention utilizes an inline, ball-type check valve, however, other types of valves could be used. The valve element 115 of the preferred embodiment is a ball 118, although other elements may be utilized. The ball 118 is biased into a valve-closed position by a compression spring 116 located within the valve element retaining region 112.

A cap 120, having a fluid-entering aperture 124 therethrough, is coaxially connected to the valve body 100 relative to valve element retaining region 112 so as to retain the ball 118 and spring 116 within the valve element retaining region 112. It should be noted that while the cap 120 is shown in cross-section in FIG. 5, it is removed in FIG. 6 for the purpose of showing additional detail.

For operation, the oil jet 98 is connected to the engine block with a mounting bolt through the mounting aperture 108 in the mounting tab 106. The nozzles 122 are positioned so as to provide oil to a desired location. Oil under pressure is supplied to the oil jet 98 typically through an oil line (not shown) which is connected to the oil jet valve body 100 along perimeter 130. Oil under pressure is then drawn from an oil reservoir (not shown) through an oil pump (not shown) to the cap aperture 124.

Figure 6:
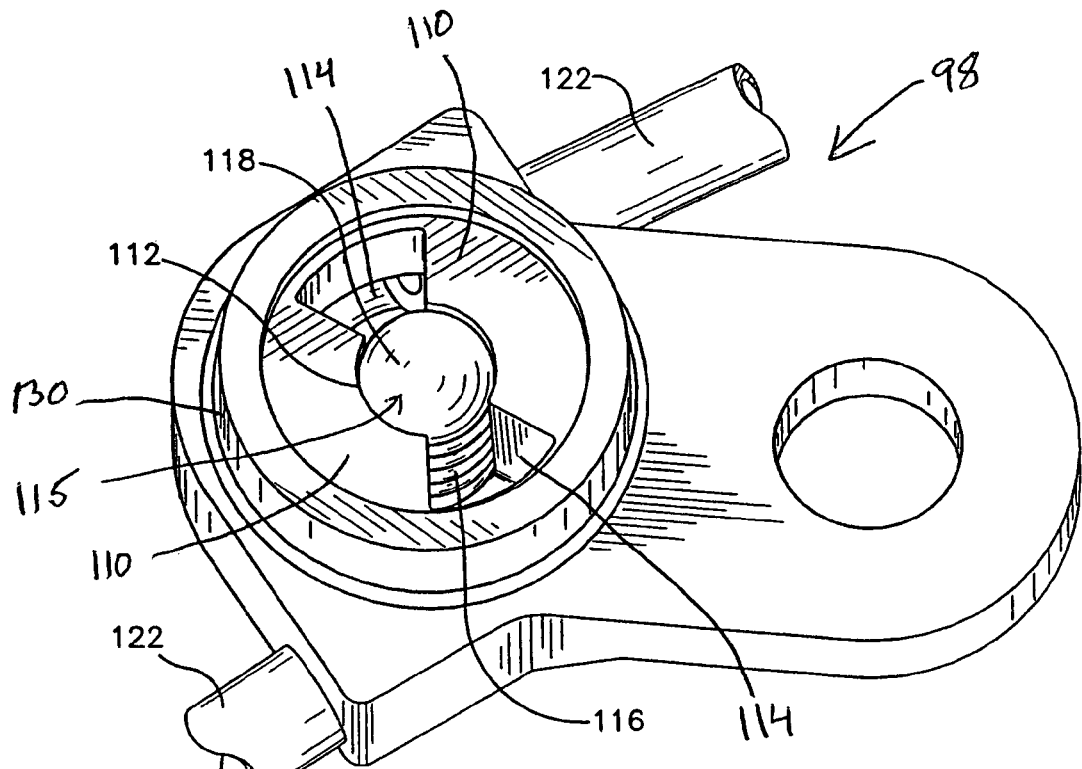
FIG. 6 is a perspective view of the oil jet of FIG. 5 without the cap so as to show details within the valve element retaining region.

With continued reference to FIG. 5 and FIG. 6, when the oil pressure is above a predetermined value, oil under pressure overcomes the spring force and depresses the ball 118 within the valve element retaining region 112 to a valve-open position. With the ball 118 no longer in its resting valve-closed position seated on the underside of the cap aperture 124, oil is permitted to flow through the cap aperture 124, into the valve element retaining region 112, and around and over the ball 118 and into the oil passages 114. Oil under pressure passes through the oil passages 114 and through the oil-exiting apertures 102 to the nozzle 122. Oil under pressure is sprayed from the nozzle 122 upon the desired location, e.g. the pistons.

The ball 118 is forced into a valve-open position as long as the oil pressure is maintained above the predetermined value. When the oil pressure falls below the predetermined value, the spring 116 urges the ball 118 to a valve-closed position and seats the ball 118 against the underside of the cap aperture 124 to prevent a siphoning off of oil pressure.

The valve element retaining region 112 permits the ball 118 to move longitudinally therein between a valve-closed position and a valve-open position while restraining the ball 118 from vacillating and causing aeration and cavitation of the oil. Therefore, the ball 118 cannot vacillate within the cavity 104 in response to the flow of oil over and around the ball 118.

Although the preferred embodiment of the present invention has been illustrated in the accompanying drawings and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

Having thus described the invention, I claim:

1. A fluid jet for providing fluid under pressure to a desired location, the fluid jet comprising:
    a valve body;
    a valve element retaining region integrally formed with the valve body by a pair of confronting walls, wherein the valve element retaining region extends longitudinally within at least a portion of the valve body;
    a fluid passage defined by a space between said confronting walls extending longitudinally within at least a portion of the valve body and in fluid communication with at least a portion of the valve element retaining region;
    wherein the valve body is die cast as a one-piece component.

2. The fluid jet of claim 1 further comprising:
    a fluid-exiting aperture through the valve body in fluid communication with the fluid passage.

3. The fluid jet of claim 2 further comprising:
    at least one nozzle connected to the fluid-exiting aperture for directing fluid under pressure to a desired location.

4. The fluid jet of claim 1 further comprising:
    a fluid pressure actuated valve element located within the valve element retaining region and moveable longitudinally therealong between a valve open and a valve closed position.

5. The fluid jet of claim 4 wherein the valve element retaining region prevents the valve element from vacillating within the valve body.

6. The fluid jet of claim 4 further comprising:
    a cap having a fluid-entering aperture therethrough, the cap coaxially connected to the valve body relative to the valve element retaining region so as to retain the valve element therein.

7. The fluid jet of claim of claim 6 further comprising:
    a spring located within the valve element retaining region and biasing the valve element toward the cap.

8. The fluid jet of claim 7 wherein the valve element is spring biased against the fluid-entering aperture during a valve closed position and is moveable against the spring force along the valve element retaining region during a valve open position in response to a predetermined oil pressure.

9. A fluid jet transferring fluid under pressure to a desired location, the fluid jet comprising:
    a valve body having a bore extending along a length of the valve body for transferring fluid therethrough;
    a valve element retaining region formed within the bore of the valve body by a pair of confronting walls integral with the valve body;
    a fluid passage defined by a space between said confronting walls extending longitudinally within at least a portion of the valve body and in fluid communication with at least a portion of the valve element retaining region; and
    a valve element located within the valve element retaining region and moveable longitudinally along the length of the valve body between a valve open and a valve closed position, wherein fluid enters the valve body and valve element retaining region at the valve open position, wherein the valve element is moveable to the valve open position at a predetermined fluid pressure, and further wherein the valve element retaining region has a diameter corresponding in size to a diameter of the valve element such that the walls of the valve element retaining region prevent the valve element from vacillating along the length of the valve body.

10. The fluid jet of claim 9 wherein the valve element has a diameter substantially equal to a diameter of the walls of the valve element retaining region.

11. The fluid jet of claim 9 wherein the valve body and the valve element retaining region are die cast as a one-piece component.

12. The fluid jet of claim 9 further comprising:
    a spring biasing said valve element along the length of the valve body, the spring biasing said valve element into the valve closed position.

13. The fluid jet of claim 12 wherein the valve element compresses the spring at the predetermined fluid pressure to move to the valve open position.

14. The fluid jet of claim 9 wherein the walls of the valve element-retaining region form a second bore within the bore of the valve body.

15. The fluid jet of claim 9 further comprising:
   a cap having an aperture therethrough, the cap coaxially connected to the valve body to retain the valve element within the valve body.

16. A fluid jet for providing fluid to a desired location, the fluid jet comprising:
   a valve body having a bore extending longitudinally for passing fluid therethrough;
   a pair of confronting walls within the bore of the valve body forming a valve element retaining region, the valve element retaining region extending longitudinally within the bore of the valve body, the walls having a diameter sized to receive a valve element and prevent the valve element from vacillating within the valve body along the length of the valve element retaining region;
   a fluid passage defined by a space between said confronting walls extending longitudinally within at least a portion of the valve body and in fluid communication with at least a portion of the valve element retaining region; and
   a biasing member located substantially within the valve element retaining region and biasing the valve element toward a valve closed position and is movable along the length of the valve element retaining region during a valve open position in response to a predetermined fluid pressure.

17. The fluid jet of claim 16 further comprising:
   a nozzle connected to the valve body and in fluid communication with the bore of the valve body, the nozzle directing fluid under pressure to a desired location.

18. The fluid jet of claim 16 wherein the valve element is a ball.

19. The fluid jet of claim 18 wherein the walls defining the valve element retaining region are semi-circular and have a diameter substantially equal to a diameter of the ball.

20. The fluid jet of claim 16 wherein the valve body and the walls forming the valve element retaining region are die cast from powdered metal.

* * * * *

UNITED STATES PATENT AND TRADEMARK OFFICE
CERTIFICATE OF CORRECTION

PATENT NO.         : 7,766,035 B2                                             Page 1 of 1
APPLICATION NO.    : 11/634489
DATED              : August 3, 2010
INVENTOR(S)        : Jose Correa Neto It is certified that error appears in the above-identified patent and that said Letters Patent is hereby corrected as shown below:

Title page
Related U.S. Application Data:

insert:

--(63) Continuation of application No. 10/914,297, filed on August 9, 2004, now Pat. No. 7,152,623.

(60) Provisional application No. 60/501,472, filed on Sep. 9, 2003.--

Signed and Sealed this
Twelfth Day of July, 2011

David J. Kappos
*Director of the United States Patent and Trademark Office*